United States Patent [19]
Coy et al.

[11] Patent Number: 5,091,654
[45] Date of Patent: Feb. 25, 1992

[54] METHOD OF AUTOMATICALLY SETTING DOCUMENT REGISTRATION AND LOCATING CALIBRATION STRIP

[75] Inventors: Gerald L. Coy, Rochester; Kenneth Buck; William Blitz, both of Webster, all of N.Y.

[73] Assignee: Xerox Corporation, Stamford, Conn.

[21] Appl. No.: 573,825

[22] Filed: Aug. 28, 1990

[51] Int. Cl.$^5$ ............................................. G01N 21/86
[52] U.S. Cl. ..................................... 250/561; 356/401
[58] Field of Search ................ 250/548, 561; 356/400, 356/401; 358/486, 449

[56] References Cited

U.S. PATENT DOCUMENTS

| | | | |
|---|---|---|---|
| 3,783,293 | 1/1974 | Gold et al. | 250/548 |
| 3,970,841 | 7/1976 | Green | 250/548 |
| 4,238,780 | 12/1980 | Doemens | 250/561 |
| 4,511,242 | 4/1985 | Ashbee et al. | 355/14 C |
| 4,605,970 | 8/1986 | Hawkins | 358/265 |
| 4,647,981 | 3/1987 | Froelich | 358/285 |
| 4,711,552 | 12/1987 | Nilsson et al. | 355/3 R |
| 4,724,330 | 2/1988 | Tuhro | 250/208.3 |
| 4,831,420 | 5/1989 | Walsh et al. | 355/203 |
| 4,864,415 | 9/1989 | Beikirch et al. | 358/474 |
| 4,903,079 | 2/1990 | MacAndrew | 355/235 |
| 4,929,844 | 5/1990 | Houjiyou et al. | 250/561 |
| 4,971,444 | 11/1990 | Kato | 356/401 |
| 5,021,676 | 6/1991 | Dragon et al. | 250/561 |

OTHER PUBLICATIONS

7650 Pro Imager IBM PC Compatible Service Manual, ADJ 4.1 Registration and Skew Adjustment (4/89) pp. 4-3.

Primary Examiner—David C. Nelms
Assistant Examiner—S. Allen
Attorney, Agent, or Firm—Oliff & Berridge

[57] ABSTRACT

A method of locating the position of an object on the platen of a raster input scanner having a movable scan carriage and an extended array of scanners is disclosed. The method includes the steps of obtaining a previously stored theoretical position of the object from a memory, locating the scan carriage at a position spaced a predetermined distance from the previously stored position, moving the scan carriage toward the previously stored position while operating at least some of the scanners until a target on the object is detected by the operating scanners, and storing a target position of the scan carriage where the target is detected. The target position can represent the location of the scanner's calibration strip or the registration position of a document. After the target position is stored, the scan carriage can be located at the target position for calibrating the scanners if the target position represents the location of the calibration strip. Alternatively, the scan carriage can be located at the target position prior to actuating the scanners for each subsequent document to be scanned if the target position represents a document registration position. This procedure is repeated to determine the document registration positions for documents which are placed on the platen manually, by an SADH or SALDH input, by a CFF input, or by an RDH input.

34 Claims, 6 Drawing Sheets

FIG. 6

*dC* dC 604 Registration Setup

PRINTER / SCANNER / CONTROLLER

RDH

| Registration | Scan # 1 2 3 4 5 | Average Error | Present Setpoint | Range | New Setpoint |

Side-to-Side (Slow Scan) — CHECK: 0.0±0.2mm mm

Top-to-Bottom (Fast Scan) — CHECK: 0.0±0.2mm mm — NVM 0-002, 002

Skew

Side-to-Side (Slow Scan) — CHECK: 0.0mm±0.5mm mm

Top-to-Bottom (Fast Scan) — CHECK: 0.0mm±0.5mm mm — NVM 1-002, 002

Total Scans: 0    Reset Display: C

System Registration & Skew Test Pattern

Platen
RDH
SADH & CFF
SADH
Information

Enter
Reset   Start
Stop

50

METHOD OF AUTOMATICALLY SETTING DOCUMENT REGISTRATION AND LOCATING CALIBRATION STRIP

BACKGROUND OF THE INVENTION

1. Field of the Invention

The present invention relates to methods of automatically setting document registration and locating a calibration strip in an image inputting machine, and in particular to methods of automatically setting document registration and locating a calibration strip in an image inputting machine which includes an electronic scanner for reading data from a document and transforming that data into digital signals which can be stored and/or analyzed.

2. Description of Related Art

Traditionally, Universal Document Handlers (UDH) used with copiers or image inputting machines require mechanical adjustment of mirrors, scan carriage assemblies, or other assemblies to adjust document registration. One such mechanical adjustment involves setting the document registration so that the scan carriage which inputs data contained on the documents begins its scanning traversal of the document at an edge of the document. Another adjustment, required with electronic scanners, involves location of a calibration strip which is used to calibrate the Charge Coupled Devices (CCD) which typically make up the scanning array.

Difficulties in automatic document handling systems in general are discussed hereinbelow. These difficulties include the criticality of document registration and the need for increased automation and operator simplification especially with current increases in document handling speeds.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

The art of original document sheet handling for copiers has been intensively pursued in recent years. Various systems have been provided for automatic or semiautomatic feeding of document sheets to and over the imaging station of the copier for copying. The documents are normally fed over the surface of an imaging station comprising a transparent platen, into a registered copying position on the platen, and then off the platen. Such automatic or semiautomatic document handlers eliminate the need for the operator to place and align each document on the platen by hand. This is a highly desirable feature for copiers. Document handlers can automatically feed documents as fast as they can be copied, which cannot be done manually with higher speed copiers, thus enabling the full utilization or productivity of higher speed copiers.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, it is desirable that a document registration edge alignment or positioning system be available for such manual copying which is compatible with that used for the document handler.

One of the most difficult to achieve features for automatic document handling is the rapid, accurate, reliable, and safe registration of each document at the proper position for copying. Conventionally the document is desirably either center registered or corner registered (depending on the copier) by the document handler automatically at a preset registration position relative to the copier platen. At this registration position, two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of a full sized (full frame) platen which is at least as large as the largest document to be normally copied automatically. In such systems the document is preferably either scanned or flashed while it is held stationary on the platen in the desired registration position. That is, in these full frame systems the document is preferably registered by being stopped and held during imaging at a preset position over the platen glass which is adjacent one side or edge thereof.

As shown in the art, and further discussed below, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying as well as registering the document.

The present invention is particularly suitable for precollation copying, i.e. automatically plurally recirculated document set copying provided by a recirculating document handling system or "RDH". However, it also has applicability to nonprecollation, or postcollation, copying, such as postcollation operation of an RDH or semiautomatic document handling (SADH). Postcollation copying, or even manual document placement, is desirable in certain copying situations, even with an RDH, to minimize document handling, particularly for delicate, valuable, thick or irregular documents, or for a very large number of copy sets. Thus, it is desirable that a document handler for a precollation copying system be compatible with, and alternatively usable for, post collation and manual copying as well.

Some examples of Xerox Corporation RDH U.S. Patents are U.S. Pat. No. 4,459,013 issued July 10, 1984 to T. J. Hamlin et al; U.S. Pat. No. 4,278,344 issued July 14, 1981 to R. B. Sahay; and U.S. Pat. Nos. 4,579,444, , 325 or 326. Some other examples of recirculating document handlers are disclosed in U.S. Pat. Nos. 4,076,408; 4,176,945; 4,428,667; 4,330,197; 4,466,733 and 4,544,148. A preferred vacuum corrugating feeder air knife, and a tray, for an RDH, are disclosed in U.S. Pat. Nos. 4,418,905 and 4,462,586. An integral semiautomatic and computer form feeder (SADH/CFF), which may be an integral part of an RDH, as noted in col. 2, paragraph 2, therein, is disclosed in U.S. Pat. No. 4,462,527. Various others of these patents, such as U.S. Pat. No. 4,176,945 above, issued Dec. 4, 1979 to R. Holzhauser (Kodak) teach plural mode, e.g. RDH/SADH, document handlers.

Regardless of the type of document handler used, or whether any document handler is used, the scan carriage must be properly aligned with the registration positions of documents on the platen. This alignment has been done in the past by determining the amount of adjustment needed to compensate for misalignment between the registration position to which a document is positioned (either manually or by a document handler) and the scan carriage start position, and manually adjusting either the scan carriage (or copier) or the document handler so that the registration position of the document and the initial scan carriage position are aligned. Since it is desirable to use a type of document handler that includes structure for feeding documents automatically from an RDH input and semiautomatically from an SADH input, (the SADH input also being capable of receiving computer fan folds (CFF)) which document handler locates sheets at different positions on the platen depending on whether the sheets are fed from the RDH or SADH inputs, up to three separate adjustments must be made in order to align the scan carriage with the registration positions of documents Additionally, since it is desirable to use a document handler which is compatible with a variety of different copying machines or input scanners (known as universal document handlers (UDH)), it is desirable to provide an input scanner which can adjust itself to the document registration positions of the UDH so that production tolerance in the manufacture of the UDH and input scanner need not be coordinated with each other with high tolerances. It is also desirable to provide a system for registering a document scanner to sheets placed on a platen which does not require every sheet to be prescanned since prescanning slows down the throughput of the scanner.

U.S. Pat. No. 4,831,420 to Walsh et al. discloses a system for setting or adjusting the proper registration position of the original documents in a copier having a document feeder providing a variable document registration position on the platen, and numeric data key entries in specialized diagnostic modes, and non-volatile memory. The system involves registering and copying a test sheet using the document feeder in its initial, unadjusted, registration setting. The test sheet has a test pattern of registration position indicia with identifying numeric indicia, and also includes a registration window at an optically reversed position on the test sheet from the test pattern and a cursor pointing to a specific position within the window. The test sheet is laid over a same-size copy of the test sheet, with the sheet edges aligned, but with the two sheets rotated by 180° relative to one another, so that the copy of the test pattern on the copy sheet underlies and is visible through the registration window of the test sheet, whereby the cursor on the test sheet points to a specific registration identifying numeric indicia within the test pattern copy. The copier resets in non-volatile memory the registration position of the document feeder based upon an operator entering the identifying numeric indicia into the numeric data key entries of the copier.

U.S. Pat. No. 4,724,330 to Tuhro, assigned to Xerox Corporation, discloses a system which includes a raster input scanning device including a linear photoelectric sensor array and a movable carriage for moving an aperture card which contains information across the scanning array. The aperture card includes a target which is used by the scanning device to calculate Y-axis and X-axis offset values representative of the distances in the Y and X directions which the information on the aperture card differs from a predetermined location The offset values are used to discard data inputted from portions of the aperture card which do not contain any information.

A publication entitled "7650 Pro Imager IBM PC Compatible Service Manual", published April 1989, discloses on page 4-3 registration and skew adjustment of a document handler to a copying machine which utilizes a test document having a black edge. It appears as if the registration is manually adjusted.

U.S. Pat. No. 4,711,552 to Nilsson discloses an electrophotographic copier which synchronizes copy sheet gating, optic start of scan and document conveyor registration The start of scan of the optics assembly is effected by positioning a test master document having dark portions adjacent its leading and trailing edges on the platen, making a copy of the test master document, determining the length of undeveloped area adjacent to the leading edge of the copy, and adjusting the start of scan as a function of the determined length. These steps are done by visual inspection or by an optical sensor which is located downstream of the toner fixing station. The adjusting may be done electronically or mechanically.

U.S. Pat. No. 4,864,415 to Beikirch et al., assigned to Xerox Corporation, discloses a system for self-aligning a raster input scanner in a slow scan direction. The carriage is moved in the scan direction until sensed by a limit switch. Upon detection of the carriage by the limit switch, the carriage motion is reversed and the carriage is moved in the pre-scan direction over a target. The target, having a variable density image, is scanned until a preset target image line is obtained and the scan carriage position is registered. From this position, the carriage continues moving in the pre-scan direction until the length of the platen is scanned a predetermined number of scan lines. Then the carriage is reversed and moved in the scan direction to scan a document. Movement continues until the predetermined number of scan lines is counted at which time the image signals from the target are compared with the registration reference image. If a difference is detected, a fault flag is set. This procedure is carried out for every sheet to be copied and thus greatly decreases the efficiency of the machine.

U.S. Pat. No. 4,511,242 to Ashbee et al. discloses an electronic alignment of paper feeding components in a electrophotographic copier machine. Alignment is accomplished by placing an original master containing vernie calibrations on the document glass and a target master containing vernier calibrations in a copier paper bin. The machine is operated to produce a copy of the original master onto the target master to produce a double set of calibrations on the target master. When prepared, the copy provides information relating to skew angle, side edge registration and lead edge alignment of the image to the copy paper. This information is used to manually adjust the copier. Sensors are located in the copy paper path to automatically correct for deviations by calculating an average correction needed after a predetermined number of copies are made. This device compensates for the location of an original on a glass platen by adjusting the positioning of the receiving sheet relative to a photoreceptor drum.

U.S. Pat. No. 4,605,970 to Hawkins discloses a method and apparatus for calibrating an optical document digitizer.

U.S. Pat. No. 4,647,981 to Froelich, assigned to Xerox Corporation, discloses an automatic white level control for a raster input scanner. A circuit is provided to add a correction based on a predetermined correction curve for determining the amount of deviation of a light level from a desired level.

The disclosed apparatus may be readily operated and controlled in a conventional manner with conventional control systems. Some additional examples of control systems for various prior art copiers with document handlers, including sheet detecting switches, sensors, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in general, and preferable, to program and execute such control functions and logic with conventional software instructions for conventional microprocessors This is taught by the above and other patents and various commercial copiers. Such software will of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems.

All references cited in this specification, and their references, are incorporated by reference herein where appropriate for appropriate teachings of additional or alternative details, features, and/or technical background.

OBJECTS AND SUMMARY OF THE INVENTION

It is an object of the present invention to provide an input scanner which can automatically register its scan carriage to objects in its path.

It is another object of the present invention to provide an input scanner which automatically adjusts itself so that the scan carriage begins scanning at the leading edge of a document.

It is a further object of the present invention to provide an input scanner which automatically locates the position of a calibration strip.

To achieve the foregoing and other objects, and to overcome the shortcomings discussed above, a method of locating the position of an object on the platen of a raster input scanner having a movable scan carriage and an extended array of scanners is disclosed. The method includes the steps of obtaining a previously stored theoretical position of the object from a memory, locating the scan carriage at a position spaced a predetermined distance from the previously stored position, moving the scan carriage toward the previously stored position while operating at least some of the scanners until a target on the object is detected by the operating scanners, and storing a target position of the scan carriage where the target is detected. The target position can represent, for example, the location of the scanner's calibration strip or the registration position of a document. After the target position is stored, the scan carriage can be located at the target position for calibrating the scanners if the target position represents the location of the calibration strip. Alternatively, the scan carriage can be located at the target position prior to actuating the scanners for each subsequent document to be scanned if the target position represents a document registration position. This procedure is repeated to determine the document registration positions for documents which are placed on the platen manually, by an SADH or SALDH input, by a CFF input, or by an RDH input.

BRIEF DESCRIPTION OF THE DRAWINGS

The invention will be described in detail with reference to the following drawings in which like reference numerals refer to like elements and wherein:

FIG. 6 illustrates a display outputted on a monitor when operating a document scanner in the registration mode.

DETAILED DESCRIPTION OF THE PREFERRED EMBODIMENTS

Figure 1:
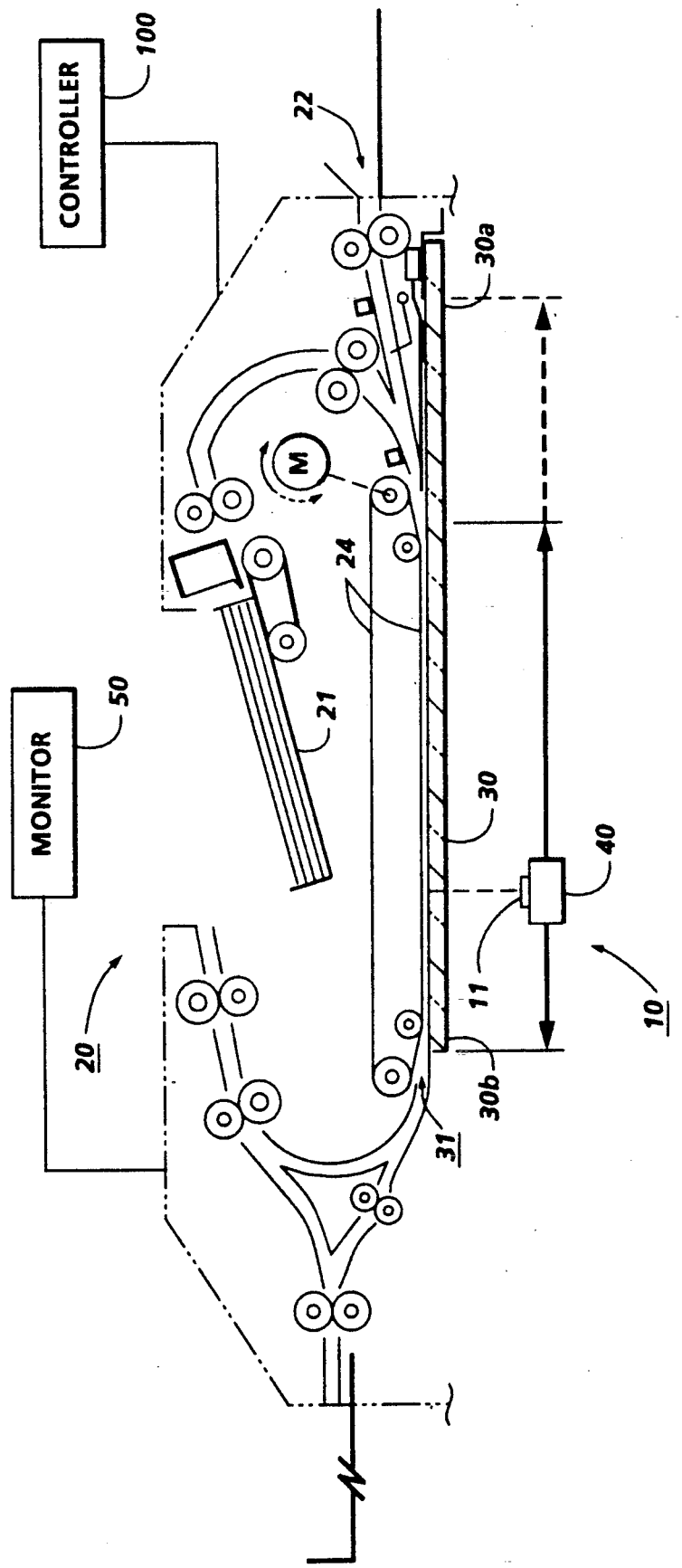
FIG. 1 is a schematic side view of an RDH/SADH document handler and electronic image scanner usable with the present invention.

For purposes of illustration, in FIG. 1, a universal document handler (UDH) 20 is illustrated in association with an image scanning system 10. The universal document handler 20 can be similar to that disclosed in co-pending U.S. patent application Ser. No. 07/559,020 to James R. Graves et al and entitled "SCANNER DOCUMENT ABSENCE CODE SYSTEM" filed July 27, 1990 the disclosure of which is herein incorporated by reference. The image scanning system 10 includes an array of scanners 11, for example, Charge Coupled Devices, mounted on a movable scan carriage 40 which traverses along beneath a transpent platen 30 from one end 30a to another end 30b thereof. A number of mirrors and a lens are provided to focus and condense the light image reflected from the original document onto the array of scanners since the array of scanners 11 is much smaller than the width of platen 30 as is well known in the art. The image scanning system 10 is also operatively connected to a monitor 50 for monitoring the data inputted by the scanner as well as for outputting information on its screen for use by operators of the scanner to be described below.

Universal document handler 20 is pivotally attached to an upper surface of the image scanning system by hinges 32 (see FIG. 2) so that the UDH can be lifted off of platen 30 for manually placing documents on platen 30. UDH 20 also includes a top or RDH stacking tray 21 for receiving sheets to be fed to platen 30 and read by scanning system 10 in a recirculating fashion. An SADH/CFF input slot 22 is also provided for inputting sheets or computer forms in a semiautomatic fashion. UDH 20 also operates in an SALDH mode, whereby long sheets (e.g., have a length greater than 12 inches) are inputted at slot 22 and located on platen 30. After passing through appropriate sets of drive rollers, the document is fed across platen 30 by a transport belt 24. As described earlier, transport belt 24 momentarily stops the sheets on platen 30 so that they can be read by scanner array 11. Sheets exit platen 30 at outlet 31 and are either returned to RDH stacking tray 21 or outputted to an output tray. The operation of UDH 20 is controlled by controller 100.

Figure 2:
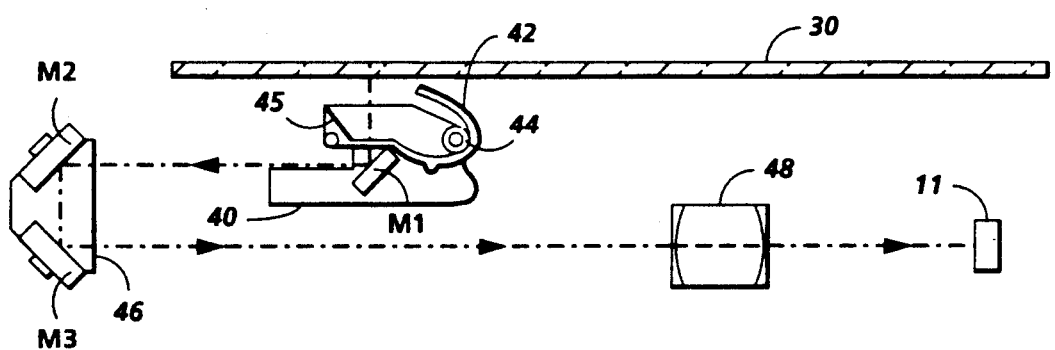
FIG. 2 is a schematic side view of an image scanner which utilizes a movable scan carriage and a fixed array of scanners.

FIG. 2 is a side schematic view of an image scanner which includes a movable carriage 40 and a scanner array 11 which is fixedly mounted within the frame of the document scanner. Thus, unlike the embodiment shown in FIG. 1, scanner array 11 does not move with scan carriage 40. The optical system includes a stationary glass platen 30 on which an original document to be reproduced is located for copying. The original document is illuminated in known manner a narrow strip at a time by a light source comprising, for example, a tungsten halogen lamp 44. Light from the lamp is concentrated by an elliptical reflector 42 and directed to the platen and to an inclined mirror 45. The two light components combine to form a narrow strip of light at the side of the original document facing the platen 30. The original document thus exposed is imaged onto a scanner array 11 via system of mirrors M1 to M3 and focusing lens 48. In order to copy the whole original document, the lamp 44, the reflector 42, and mirror 45 are mounted on full rate carriage 40 which travels laterally at a given speed directly below the platen and thereby scans the whole document. Because of the folded optical path, the mirrors M2 and M3 are mounted on another carriage 46 which travels laterally at half the speed of the full rate carriage in order to maintain the optical path constant.

Figure 3:
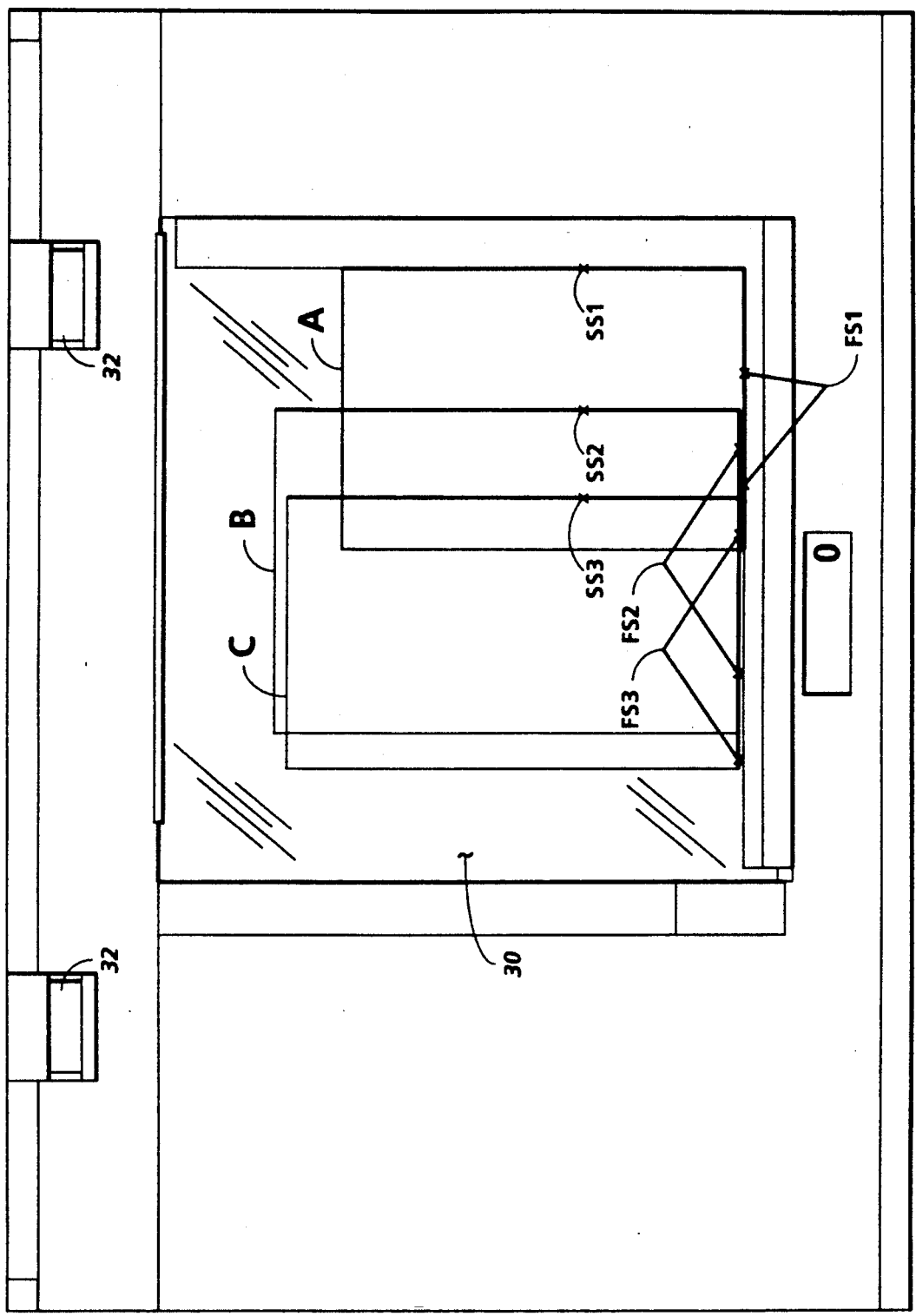
FIG. 3 is a plan view of the transparent platen of a document scanner illustrating the positions of sheets on the platen when placed thereon either manually, by an RDH or by an SADH.

FIG. 3 illustrates the different positions where a sheet will be located on platen 30. A sheet will be located at position A when it is manually placed on platen 30, whereas the sheet will be located at position B when fed by SADH (i.e., inserted into input 22) and located at position C when inputted from stacking tray 21 and fed by RDH. When operating in SALDH mode, a sheet is located between positions B and C. The present invention properly registers the start position of scan carriage 40 to the actual location of the sheet on the platen for each mode of operation of the device by using the CCD's of the scanner array 11 to determine where the sheet is located on platen 30 when placed there either manually, by the RDH, by the SADH, or by the SALDH. The registration position for CFF can be determined from the SADH registration position. The registration position of a sheet for each mode of feeding is determined by placing a test document containing a test pattern or target thereon which can be detected by the CCD's of the scanner array 11. In particular, the test pattern is used to locate the edges of the test document by moving scan carriage 40 in the slow scan direction (that is, the direction in which scan carriage moves) to detect the location of a trailing side edge of the sheet (SS1, SS2, and SS3 for sheets A, B, C and the SALDH position between B and C respectively). Once the trailing side edge of the sheet is located, scan carriage 40 is moved to two different positions wherein the scan carriage extends across the sheet, the scan carriage is stopped in each position and all of the scanners in the scanning array 11 are actuated to detect the top and bottom edges of the sheet at two different locations. This is known as fast scanning and is performed on each sheet, for example at points FS1, FS2 and FS3 for each of sheets A, B and C, respectively.

The information obtained by the scanner array is then utilized in a manner to be described below to automatically set the scan carriage to begin scanning documents at the location of the trailing side edge as determined by the slow scan. By starting carriage 40 at the exact location of the sheet, the movement required by carriage 40 is reduced, thus increasing throughput, and data which contains no information (i.e., from portions of the platen not covered by the document) does not have to be analyzed and discarded as in previous systems. Additionally, only the scanners of the scanning array necessary to input all the information from each sheet are actuated (as determined by the fast scan operation) so that data from scanners located over areas of the platen 30 which do not contain the sheet is not inputted or analyzed.

The top, bottom and side edges of each sheet are detected by running a test sheet over platen 30 which contains a test pattern thereon through the RDH, SADH and SALDH modes as well as the manual mode of the device. The test sheet could be entirely black so that the ability of the scanners on the scanner carriage 40 to detect the transition from black to white which occurs at the edges of the test sheet which is covered by a white platen cover is utilized to detect the lead and side edges of a sheet.

Figure 4:
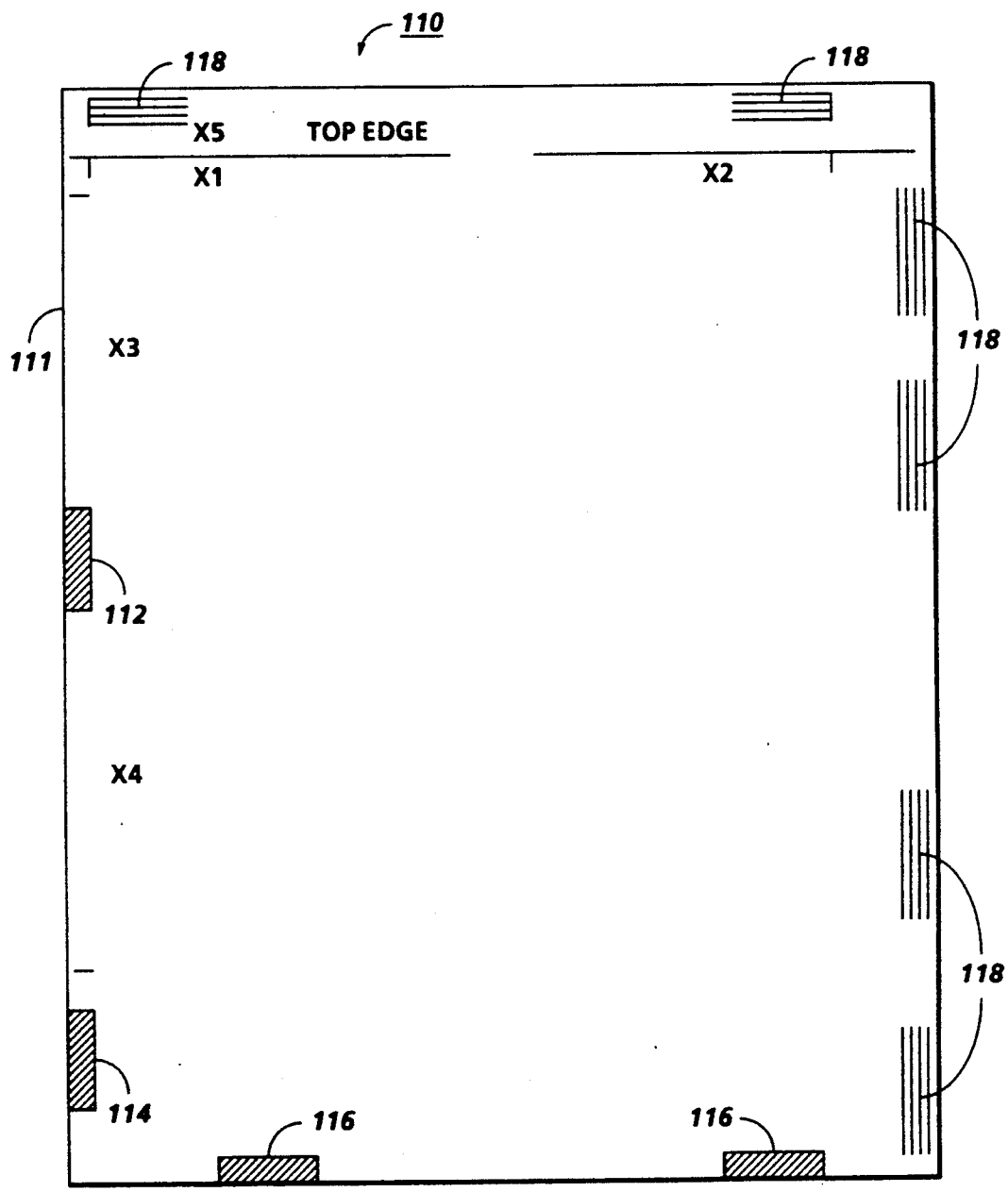
FIG. 4 illustrates a sheet containing a test pattern usable with the present invention.

Preferably, the test sheet includes a test pattern as illustrated in FIG. 4. The black to white transition is still utilized, however the entire sheet is not made black. Test sheet 110 includes a trailing side edge 111 which is the edge of the sheet used when scanning in the slow scan direction. Instead of scanning for the trailing edge of the sheet with all of the scanners in the scanning array 11, it is preferable to use two scanners in the array which are spaced from each other so that the input skew of the document can also be determined. Thus, only two darkened areas 112 and 114 are provided on the trailing side edge 111 of the test sheet 110 for detection by the two spaced apart scanners in the scanning array 11. These patterns 112 and 114 can be located, for example, at distances which are two inches and seven inches, respectively, from a bottom edge of the sheet. If the test document 110 is skewed, the test patterns 112 and 114 will be detected at two different locations relative to the slow scan direction. The average of the two locations is used as the location of the trailing side edge of the document. The system software can analyze the data inputted from the active scanners to output information on monitor 50 so that an operator can determine whether adjustment for side-to-side skew is necessary (see FIG. 6). While the present invention automatically registers the scan carriage to the document position, it does not automatically adjust for skew.

The test document 110 also includes patterns 116 spaced apart along the bottom edge thereof for use during the fast scan process. The position of the bottom edge of sheet 110 is determined at two locations by detecting patterns 116. The location of the top edge is calculated since the height of the sheet is known. Any differences in the locations of the bottom edge of the sheet relative to the fast scan direction also indicates a skew problem. For example, even if there is no detected skew in the slow scan direction, skew can exist in the fast scan direction if the scanning array is misaligned. The system software can also analyze data inputted from the scanners when located at the two fast scan locations to output information to monitor 50 regarding top-to-bottom skew. Thus, only the trailing side edge 111 and the bottom edge of the test document needs to be precisely formed and made perpendicular to each other with a high degree of accuracy since the locations of the other edges of the test document are calculated based upon the known size of the sheet. Since the trailing side edge and bottom edge of each sheet placed on platen 30 are placed in the same location regardless of the size of the sheets being fed, only a single document registration procedure is required for each mode of operation (manual, RDH, SALDH and SADH). The location of the other edges of sheets fed onto platen 30 (the leading side edge and top edge) are determined based on the location of the trailing and bottom edges determined by the document registration procedure and the size (A4, 8½×11", etc.) of the sheets being fed.

Test document 110 can also include a number of reference scales 118 located adjacent each of its edges. These reference scales 118 comprise a series of equally spaced lines which are parallel to their corresponding document edge. For example, each reference scale 118 can include three lines which are spaced one millimeter from each other, with the first line being spaced one millimeter from the document edge. The reference scales can be used to visually inspect the accuracy of the document registration system. The test document can be scanned by scan carriage 40 and either printed out with a printer or displayed on monitor 50. The number and position of the lines in each reference scale 118 can then be viewed to determine whether the document registration procedure has functioned properly. It is understood that reference scales 118 are not used or required for the present invention, but only function as a means for inspecting the accuracy of the document registration procedure.

Figure 5:
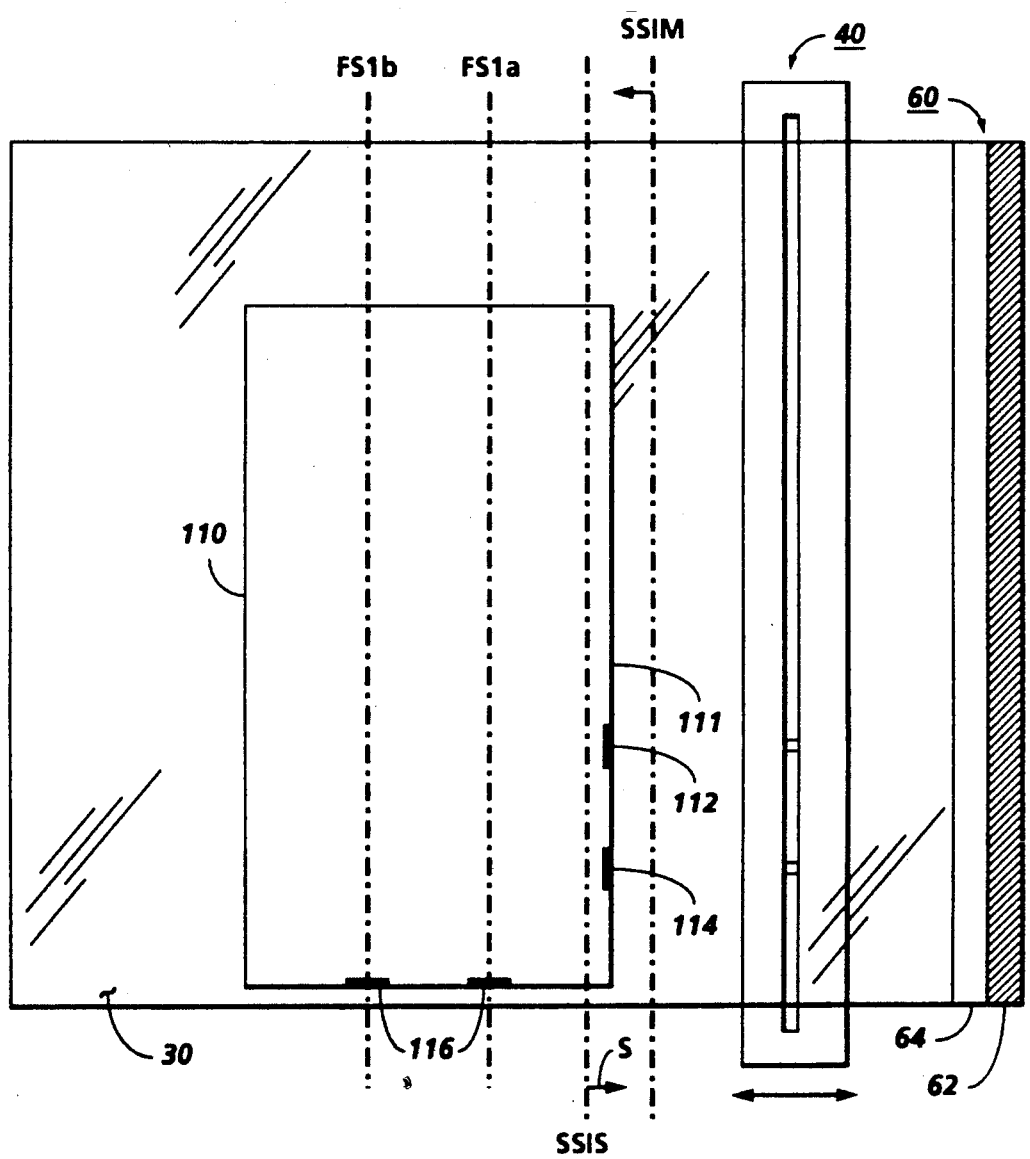
FIG. 5 is a schematic plan view illustrating the movement of a scan carriage for registering the scan carriage to a sheet placed on a transparent platen.

The process for registering scan carriage 40 to documents placed on platen 30 will be described with reference to FIG. 5. The process used to determine the registration locations of sheets fed from the RDH, SADH, SALDH or manually is similar, however when using the RDH, SADH or SALDH, a sheet is fed onto the platen and its trailing side edge and bottom edge are located using the present invention a plurality of times. An average is determined from the plurality of runs and this value is used as the registration location for the RDH, SADH and SALDH modes. The average is used because the UDH does not locate sheets on platen 30 in exactly the same position every time, but operates within a standard deviation. Thus, determining the average over a number of sheets fed by the RDH, SADH and SALDH ensures that the registration position determined for these modes is as close as possible to the actual location to which the sheets are delivered by the UDH. For example, the average of five or ten runs can be used for determining the sheet location for the RDH, SADH and SALDH modes.

As discussed above, four specific registration set up procedures are required. The four registration set up procedures are as follows: manual platen, RDH (simplex and duplex), SADH (implicitly includes CFF) and SALDH. The basic concept used to perform the registration set up includes using the Charge Coupled Devices of the scanner array 11 to find the white/black transition on a special test document 110 in the slow scan direction and finding two other white/black transitions for the fast scan direction. While manual platen registration requires only one edge finding cycle, SADH, SALDH and RDH require five or more document edge finding cycles with the average of tee cycles being used as the final registration value. CFF registration is at the same place as SADH, and therefore is determined based upon the values used in SADH.

Using RDH as an example, the registration set up diagnostic will now be described. Test sheet 110 is placed in RDH stacking tray 21 and moved onto platen 30 in the usual manner. Once on platen 30, a previously stored theoretical position SS1M of the trailing edge of the sheet is obtained from non-volatile memory (NVM). This value can be a default value or the last value at which a sheet was registered. Scan carriage 40 is then moved and located at a position SS1S which is spaced a predetermined distance from the theoretical position SS1M. Scan carriage 40 is then moved to the right while operating at least two of the scanners of the scan carriage until the black targets 112, 114 on the test sheet are detected by the operating scanners. The detection of the black areas on test sheet 110 are used to determine the location of the trailing side edge 111 of the sheet, which position is then stored in a first memory. While in the above-described example the location SS1S is to the left of the theoretical position SS1M and located over the surface of the test sheet, position SS1S could also be to the right of the theoretical position SS1M. In this case the scan carriage 40 would be moved to the left from position SS1S while operating at least two of the scanners to locate trailing side edge 111. It is preferable to locate position SS1S over the test document and scan for the white/black transition which exists on test document 110 because the white platen cover can contain dirt, marks or defects (e.g., nicks and cuts) which could cause the scanners to incorrectly detect the trailing or bottom edges of the test document. That is, when scanning for the white/black transition from the white platen cover to the black test pattern on test document 110, marks or defects on the platen cover (which can also be the transport belt 24 of the UDH) may be interpreted to be the white/black transition point. As mentioned above, when operating in RDH, SALDH or SADH modes, a test sheet is fed onto platen at least five times, each time a reading for the registration position being stored in the first memory. After the desired number of runs are made, the average value of the detected target position is determined and used for determining the registration position of subsequent sheets.

After finding the trailing edge of the sheet, the scan carriage is moved to a first scan position FS1a where all of the scanners in the scanning array are then actuated to detect the bottom edge of the sheet 110. The scan carriage 40 is then moved to a second fast scan position FS1b where this same procedure is again performed. The fast scan operation is performed on each fed test sheet subsequent to performance of the slow scan operation on that sheet. Thus when using RDH, SALDH and SADH, the fast scan operation is performed, for example, five or ten times. As stated above, the information from the fast scans is used to detect top-to-bottom skew of the document as well as the locations of the top and bottom edges of the document.

The information obtained from the slow scan and fast scan procedures is used to control the starting position of scan carriage 40 for subsequent sheets to be fed onto platen 30. Thus, the starting position of scan carriage 40 is automatically determined by the scanning device. This eliminates the need for a technician to physically adjust portions of the document handler or scan carriage and is also more accurate than physical adjusting. Additionally, by only detecting the location of the trailing edge of the document at two spaced locations, the side-to-side skew of the document can be determined and outputted to an operator so that he can determine whether or not adjustments are necessary. Registration of scan carriage 40 to the document locations is performed when the UDH 20 is initially assembled onto the document scanner's platen 30 and whenever parts of a previously registered system are replaced which will require re-registration of the system. Automatic document registration is more accurate than registration by physical adjustment and makes full use of the system hardware (the CCD's) which are already available. Additionally, since no copies need to be made to determine registration, misalignments which may exist in the printing system do not show up as misalignments between the UDH and scanning system.

Another important feature of the present invention is that CFF document registration is determined based on the SADH registration location. CFF registration is normally difficult and costly for a number of reasons. Reasons include CFF hole size and placement variability (sheet to sheet and form to form), difficulty and expense of obtaining or making a "nominal" test sheet and lastly, the time required to perform the setup is excessive and subject to human error. The present invention uses the amount of adjustment used to adjust the SADH registration position from its initial theoretical position to its actual position to adjust the registration position for CFF. At the same time the SADH registration location is being updated to eliminate any mean error, the CFF registration location can be modified the same amount and direction as was SADH. This is valid because the drives used are the same for SADH and CFF and, therefore, the magnitude and direction of the mean registration error should be the same. It is desirable to keep the actual SADH registration locations independent of the CFF registration locations in NVM so that any post semiautomatic set up fine tuning of either mode of operation can be performed independently. This method is preferable over a stand alone CFF mode setup because there is zero set up time, errors due to non-nominal CFF forms are eliminated and human errors are eliminated.

The present invention can also be used to locate the calibration strip 60 which is used to calibrate the scanners in scanning array 11. Calibration strip 60 includes a black strip 62 and a white strip 64 and is used to calibrate the scanners in scanning array 11 in a manner well known in the art. While previous systems required an operator to adjust scan carriage 40 so that it would be registered to calibration strip 60, the present invention can be utilized to locate the white to black transition of calibration strip 60. Thus, no physical adjustments are necessary. To locate the white/black transition of calibration strip 60, a previously stored theoretical or default location is obtained from NVM. The scan carriage 40 is moved a predetermined distance from the theoretical position and then the carriage is moved towards the theoretical position while operating at least some of the CCD's in scanner array 11 until the black/white transition is detected. The location of carriage 40 where the black/white transition is detected is stored in memory and the CCD's in scanning array are then calibrated by moving scan carriage 40 to the left and to the right of the stored position and performing standard calibration procedures. The location of the calibration strip is determined each time the scanning system 10 is turned on and, consequently, the scanning system never has to be manually adjusted so that the scanner array 11 is aligned with the calibration strip. This reduces the need for high tolerances between scan carriage 40 and calibration bar 60 with scanning system 10. Also, the calibration strip can be made smaller with the present invention, reducing costs and space requirements, because the scan carriage will be able to be located adjacent the calibration bar with a much higher precision than was previously attainable. The present invention also makes full use of the existing system hardware (the scanning array) to locate the calibration strip, eliminating the need for separate sensors to control the placement of the movable carriage adjacent the calibration strip.

While the present invention has been described with reference to particular preferred embodiments, the invention is not limited to the specific examples given. Other embodiments and modifications can be made by those skilled in the art without departing from the spirit and scope of the attached claims.

What is claimed is:

1. A method of locating the position of an object on the platen of a raster input scanner having a movable scan carriage and an extended array of scanners, comprising:
    a) obtaining a previously stored theoretical position of the object from a memory;
    b) locating the scan carriage at a position spaced a predetermined distance from the previously stored position;
    c) moving the scan carriage toward the previously stored position while operating at least some of the scanners until a target on the object is detected by the operating scanners; and
    d) storing a target position of the scan carriage where the target is detected.

2. The method according to claim 1, wherein said object is a scanner calibration strip having two portions which abut each other and are two contrasting colors, said target being a portion of said calibration strip where said two portions abut.

3. The method according to claim 1, wherein said object is a test document, having said target, which is located on said platen at a scan position where subsequent documents will be located for purposes of being scanned by said scan carriage, whereby said target position represents the location of said scan position.

4. The method according to claim 3, further comprising:
   e) after storing said target position, locating said scan carriage at said target position prior to actuating said scanners for each subsequent document to be scanned.

5. The method according to claim 3, wherein said scan position.

6. The method according to claim 3, wherein said test document is rectangular in shape and has a surface which is predominantly a first color, at least a portion of said surface adjacent a first edge of said test document being a second color which contrasts said first color so that said target is said second color portion adjacent said first edge, wherein step (b) includes locating said scan carriage at a position so that said scanners oppose a surface of said test document which is said first color, so that in step (c) said target is detected by sensing the change from said first color to said second color on said test document.

7. The method according to claim 3, wherein said raster input scanner includes a platen cover having a first surface movable into and out of engagement with said platen, said first surface entirely covering said platen when engaged therewith and being a first color, said test document being rectangular in shape, at least a portion adjacent a first edge thereof being a second color which contrasts said first color so that said target is said second color portion adjacent said first edge.

8. The method according to claim 7, wherein said entire first edge is said second color.

9. The method according to claim 7, wherein said entire document is said second color.

10. The method according to claim 7, wherein step (b) includes locating said scan carriage at a position spaced away from said test document so that in step (c) said target is detected by sensing the change from said first color to said second color.

11. The method according to claim 7, wherein step (b) includes locating said scan carriage at a position so that said scanners oppose a surface of said test document so that in step (c) said target is detected by sensing the change from said second color to said first color.

12. The method according to claim 7, wherein in step (c) two scanners in said extended array of scanners are operated, said two scanners being spaced from each other, each scanner detecting said target and in step (d) said target position which is stored is based upon the position of said scan carriage where each of said scanners 13. The method according to claim 12, further comprising:
   providing information relating to skew of the test document based upon the positions of said scan carriage where each of said scanners senses said target.

14. The method according to claim 13, wherein said test document includes a second edge, substantially perpendicular to said first edge, and a first pair of second color portions spaced from each other and located adjacent said second edge, said method further comprising:
   after detecting the location of said first edge, moving said scan carriage so that it is aligned with one of the second color portions of said first pair of second color portions and detecting the location of said second edge with said array of scanners;
   moving said scan carriage so that it is aligned with the other second color portion of said second pair of second color portions and detecting the location of said second edge with said array of scanners; and
   providing additional information relating to skew of the test document based upon the locations of the second edge detected by said array of scanners.

15. The method according to claim 3, wherein said raster input scanner further includes a document handler, mounted on said platen, for placing documents on said platen at said scan position.

16. The method according to claim 15, wherein said document handler is movable away from said platen so that documents can be selectively placed on said platen either manually or by said document handler, wherein step (d) includes storing a first target position based upon the location of said target when said test document is manually placed on said platen, and storing a second target position based upon the location of said target when said test document is placed on said platen by said document handler.

17. The method according to claim 15, wherein said test document is placed on said platen at said scan position by said document handler.

18. The method according to claim 17, further comprising:
   e) repeating steps (a)–(d) at least once, so that said test document is placed on said platen by said document handler at least twice so that at least two target positions are stored;
   f) determining an average target position based on the average of said at least two previously stored target positions; and
   g) storing said average target position.

19. The method according to claim 18, further comprising:
   h) after storing said average target position, locating said scan carriage at said average target position prior to actuating said scanners for each subsequent document to be scanned.

20. The method according to claim 18, wherein said document handler is a semiautomatic document handler having a document infeed area and feeding means for automatically feeding a document from said infeed area to said scan position on said platen when the document is placed into said infeed area by an operator, wherein step (e) includes placing said test document into said infeed area at least twice.

21. The method according to claim 18, wherein said document handler is a recirculating document handler having a stacking tray for receiving one or more documents, first feeding means for feeding a document from said stacking tray to said scan position on said platen, and second feeding means for feeding the document from said scan position on said platen back to said stacking tray, wherein step (e) includes placing said test document into said stacking tray and actuating said first and second feeding means at least twice so that said test document is placed on said platen at least twice.

22. A method of determining the registration position of an original document fed to the platen of a raster input scanner having a movable scan carriage and an extended array of scanners by a document handler, comprising:
   (a) feeding a test document containing at least one target onto said platen with said document handler;

(b) determining the position of said at least one target with said scanning array;

(c) storing said determined position in a first memory;

(d) repeating steps (a)–(c) at least once;

(e) determining the average value of the stored positions; and (f) storing said average value in a second memory.

23. The method according to claim 22, further comprising:

g) after storing said average target position, locating said scan carriage at said average target position prior to actuating said scanners for each subsequent document to be scanned.

24. The method according to claim 22, wherein said document handler is a semiautomatic document handler having a document infeed area and feeding means for automatically feeding a document from said infeed area to said scan position on said platen when the document is placed into said infeed area by an operator, wherein step (a) includes placing said test document into said infeed area at least twice.

25. The method according to claim 22, wherein said document handler is a recirculating document handler having a stacking tray for receiving one or more documents, first feeding means for feeding a document from said stacking tray to said scan position on said platen, and second feeding means for feeding the document from said scan position on said platen back to said stacking tray, wherein step (a) includes placing said test document into said stacking tray and actuating said first and second feeding means at least twice so that said test document is placed on said platen at least twice.

26. The method according to claim 22, wherein said test document is rectangular in shape and has a surface which is predominantly a first color, at least a portion of said surface adjacent a first edge of said test document being a second color which contrasts said first color so that said target is said second color portion adjacent said first edge, wherein step (b) includes locating said scan carriage at a position so that said scanners oppose a surface of said test document which is said first color, so that in step (c) said target is detected by sensing the change from said first color to said second color on said test document.

27. The method according to claim 22, wherein said raster input scanner includes a platen cover having a first surface movable into and out of engagement with said platen, said first surface entirely covering said platen when engaged therewith and being a first color, said test document being rectangular in shape, at least a portion adjacent a first edge thereof being a second color which contrasts said first color so that said target is said second color portion adjacent said first edge.

28. The method according to claim 27, wherein said entire first edge is said second color.

29. The method according to claim 27, wherein said entire document is said second color.

30. The method according to claim 27, wherein step (b) includes locating said scan carriage at a position spaced away from said test document and moving said scan carriage towards said test document while operating at least some of said scanners so that said target is detected by sensing the change from said first color to said second color.

31. The method according to claim 27, wherein step (b) includes locating said scan carriage at a position so that said scanners oppose a surface of said test document and moving said scan carriage towards said first edge while operating at least some of said scanners so that said target is detected by sensing the change from said second color to said first color.

32. The method according to claim 31, wherein two scanners in said extended array of scanners are operated, said two scanners being spaced from each other, each scanner detecting said target and in step (c) said target position which is stored is based upon the position of said scan carriage where each of said scanners senses said target.

33. The method according to claim 32, further comprising:

providing information relating to skew of the test document based upon the positions of said scan carriage where each of said scanners senses said target.

34. The method according to claim 33, wherein said test document includes a second edge, substantially perpendicular to said first edge, and a first pair of second color portions spaced from each other and located adjacent said second edge, said method further comprising:

after detecting the location of said first edge, moving said scan carriage so that it is aligned with one of the second color portions of said first pair of second color portions and detecting the location of said second edge with said array of scanners;

moving said scan carriage so that it is aligned with the other second color portion of said second pair of second color portions and detecting the location of said second edge with said array of scanners; and providing additional information relating to skew of the test document based upon the locations of the second edge detected by said array of scanners.

* * * * *